April 7, 1925.
W. P. HUNTER
EXPANSION HITCH
Filed Dec. 12, 1923
1,533,006
2 Sheets-Sheet 1
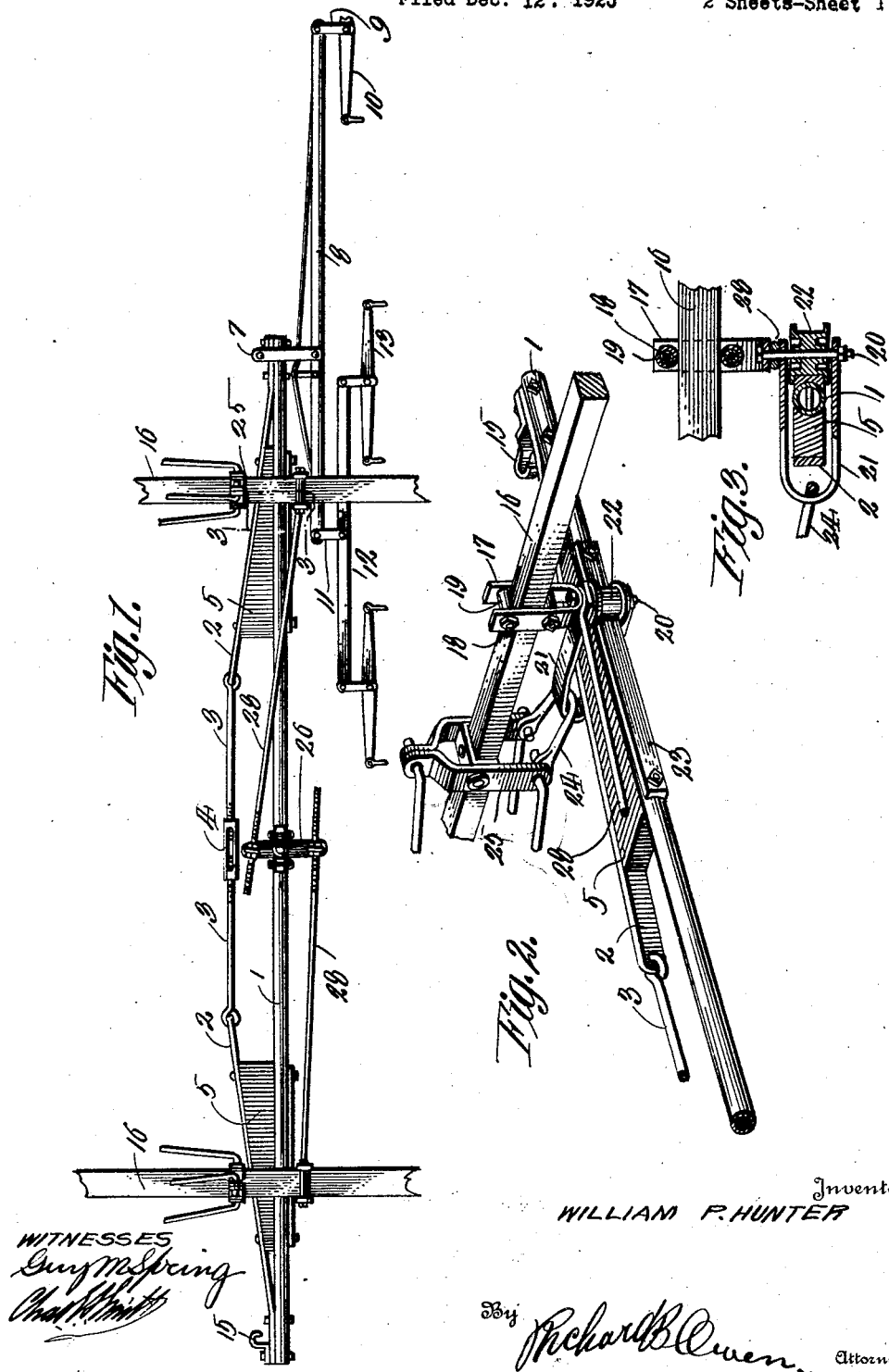
Inventor
WILLIAM P. HUNTER
By Richard B. Owen, Attorney
WITNESSES

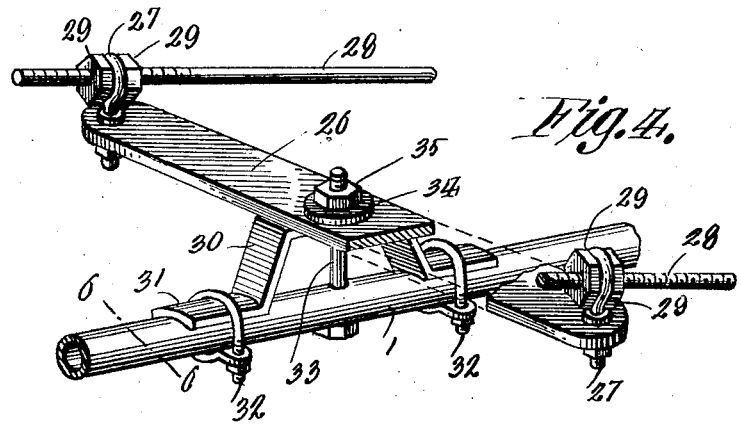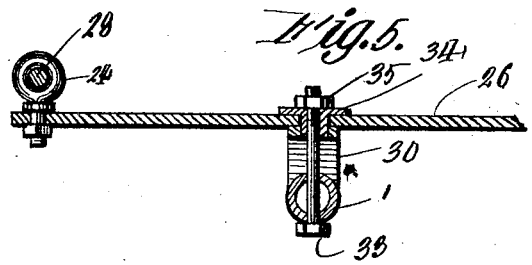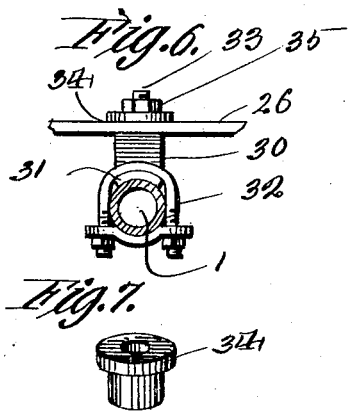

Patented Apr. 7, 1925.

1,533,006

UNITED STATES PATENT OFFICE.

WILLIAM P. HUNTER, OF PLAINS, KANSAS.

EXPANSION HITCH.

Application filed December 12, 1923. Serial No. 680,241.

*To all whom it may concern:*

Be it known that I, WILLIAM P. HUNTER, citizen of the United States, residing at Plains, in the county of Meade and State of Kansas, have invented certain new and useful Improvements in Expansion Hitches, of which the following is a specification.

The present invention relates to an expansion hitch for a whiffletree such as may be used on a two row lister cultivator.

The principal object of the invention is to provide a hitch of this nature which will allow the digging members of a lister cultivator to move transversely of the frame so as to travel in the rows, it being well known that the rows often are not equally spaced apart throughout their length.

Another important object of the invention is to provide a device of this nature having a simple and efficient construction, one which is reliable in operation, durable, strong, inexpensive to manufacture, easy to manipulate, and well adapted to the purpose for which it is designed.

With the above and other objects in view as will appear as the description progresses, the invention resides in certain novel features of the construction, and in the combination and arrangement of parts as will be hereinafter more fully described and claimed.

In the drawing:

Figure 1 is a plan view of the device embodying my invention.

Figure 2 is a detail perspective of one end thereof,

Figure 3 is a detail sectional view taken substantially on the line 3—3 of Figure 1, Figure 4 is a detail perspective view showing the manner in which the equalizing bar is ousted on the draft bar.

Figure 5 is a section through the equalizing bar,

Figure 6 is a detail section taken substantially on the line 6—6 of Figure 4, and Figure 7 is a perspective view of the washer used in conjunction with the equalizing bar.

Referring to the drawing in detail it will be seen that 1 designates the draft bar which is braced by means of plates 2 one attached to each end thereof and diverging from the bar toward the center thereof and connected by the rods 3 with a turnbuckle 4 therebetween. Substantially triangular shaped blocks 5 are disposed between the plates 2 and bar 1. At the ends of the bar 1 there are mounted the link connectors 7 for supporting equalizing bars 8. A link 9 is disposed at the outer end of each bar 8 for holding a whiffletree 10 and a link 11 is attached to the other end for supporting the auxiliary equalizing bar 12 upon each end of which is mounted a whiffletree 13. The connectors 7 are held in place by the hooked brackets 15.

The two tongues of a lister cultivator, not shown, or any other similar agricultural machine are indicated at 16 and are disposed over the bar 1, blocks 5 and plates 2. The bar 1 and the other elements attached thereto are supported by these tongues 16 by means of U-shaped hangers 17, each of which is provided with a pair of spaced bolts 18 having rollers 19 thereon, one roller being disposed above the tongue engaged by the brackets and the other being disposed therebelow. A bolt 20 depends from the intermediate portion of each hanger bracket 17 and pierces the ends of a U-shaped link 21. A grooved roller 22 is journaled on each bolt 20 between the terminals of the adjacent link 21. A pair of track rods 23 are disposed on the bar 1, one adjacent each block 5 for receiving the grooved roller 22 as is shown to advantage in Figure 3.

The links 21 are engaged by other links 24 which are attached to brackets 25 fixed on the tongues 16. An equalizing bar 26 is pivoted at its center to the center of the bar 1 and its ends are provided with eye bolts 27 for receiving rods 28 which are adjustably held in engagement with the eye bolts by nuts 29, one on each side of each eye bolt. The outer ends of these rods are engaged with bolts 20 as is disclosed to advantage in Figure 3. The preferred manner of fulcruming the equalizer bar 26 on the bar 1 is illustrated to advantage in Figures 4 to 7 inclusive wherein it will be seen that an inverted U-shaped bracket 30 provided with terminal feet 31 resting on the bar 1 is held in place by suitable clamps 32 engaging the bar 1 and the feet 31. A bolt 33 extends through the center of the bar 1 and through the center of bracket 30 and a washer 34, shown to advantage in Figure 7, is placed on this bolt so as to penetrate the equalizer bar 26, see Figure 5, and a nut 35 is then placed on the bolt.

From the above description it will be seen that the tongues 16 may move longitudinally of the draft bar 1 and will always be equidistant from the center or fulcrum point of the equalizing bar 26. It is to be understood, of course, that any suitably equalizing hitches may be attached to the ends of the draft bar 1, I having illustrated the preferred structure which is to be used with six draft horses. It is to be also understood that numerous other changes in the details of construction and in the combination and arrangement of parts may be resorted to without departing from the scope or spirit of the invention as hereinafter claimed or sacrificing any of its advantages.

Having thus described my invention what I claim as new is:

1. In combination, a draft bar, an equalizer bar fulcrumed to the draft bar at its center, a pair of tongues, a hanger depending from each tongue, a link fulcrumed to each hanger for receiving the draft bar, means for attaching each link to the adjacent tongue, and rods connecting the links and the ends of the equalizer bar.

2. In combination, a draft bar, an equalizer bar fulcrumed to the center of the draft bar, a pair of tongues, hangers depending from said tongues, rollers, bolts depending from said hangers upon which said rollers are journaled, links attached to said bolts and adapted to receive said draft bars, and rods connecting the ends of said equalizer bar and the bolts.

3. A draft bar of the class described including a draft bar proper, a pair of plates one attached to each end thereof and diverging therefrom toward the center thereof, blocks disposed between the plates and the draft bars, rods attached to the ends of the plates, and a turnbuckle connecting the rods.

In testimony whereof I affix my signature in presence of two witnesses.

WILLIAM P. HUNTER.

Witnesses:
H. L. OLDS,
OPAL I. OLDS.